United States Patent

[11] 3,575,001

| [72] | Inventors | Alexander J. Wilson;<br>Stuart B. Dawson, Warwickshire, England |
|---|---|---|
| [21] | Appl. No. | 833,619 |
| [22] | Filed | June 16, 1969 |
| [45] | Patented | Apr. 13, 1971 |
| [73] | Assignee | Girling Limited<br>Birmingham, England |
| [32] | Priority | June 14, 1968 |
| [33] | | Great Britain |
| [31] | | 28,298/68 |

[54] MASTER CYLINDER FOR BRAKING SYSTEMS
14 Claims, 12 Drawing Figs.

[52] U.S. Cl. ................................................. 60/54.6,
251/303
[51] Int. Cl. ..................................................... F15b 7/00
[50] Field of Search............................................. 60/54.6,
54.5, 54.6 (E); 251/298, 303; 251/40

[56] References Cited
UNITED STATES PATENTS

| 2,526,457 | 10/1950 | Bradbury.................... | 60/54.6 |
| 2,683,352 | 7/1954 | Price............................ | 60/54.6 |
| 3,232,059 | 2/1966 | Thesier........................ | 60/54.6 |
| 3,262,273 | 7/1966 | Harvey......................... | 60/54.6E |
| 3,416,316 | 12/1968 | Lewis............................ | 60/54.6E |

FOREIGN PATENTS

| 151,584 | 5/1953 | Australia...................... | 60/54.6 |

Primary Examiner—Martin P. Schwadron
Assistant Examiner—A. M. Zupcic
Attorney—Imirie & Smiley ABSTRACT: In a master cylinder a spring loaded tilting valve controls communication between a source of fluid, such as a reservoir of high pressure supply, and a pressure space in the cylinder, and the tilting valve comprises a head member mounted on the upper end of a stem. The head member is adapted to seat against a valve seating member surrounding a port for connection to the source of fluid, and an annular projection is provided on one of the members for engagement with a complementary surface on the other member.

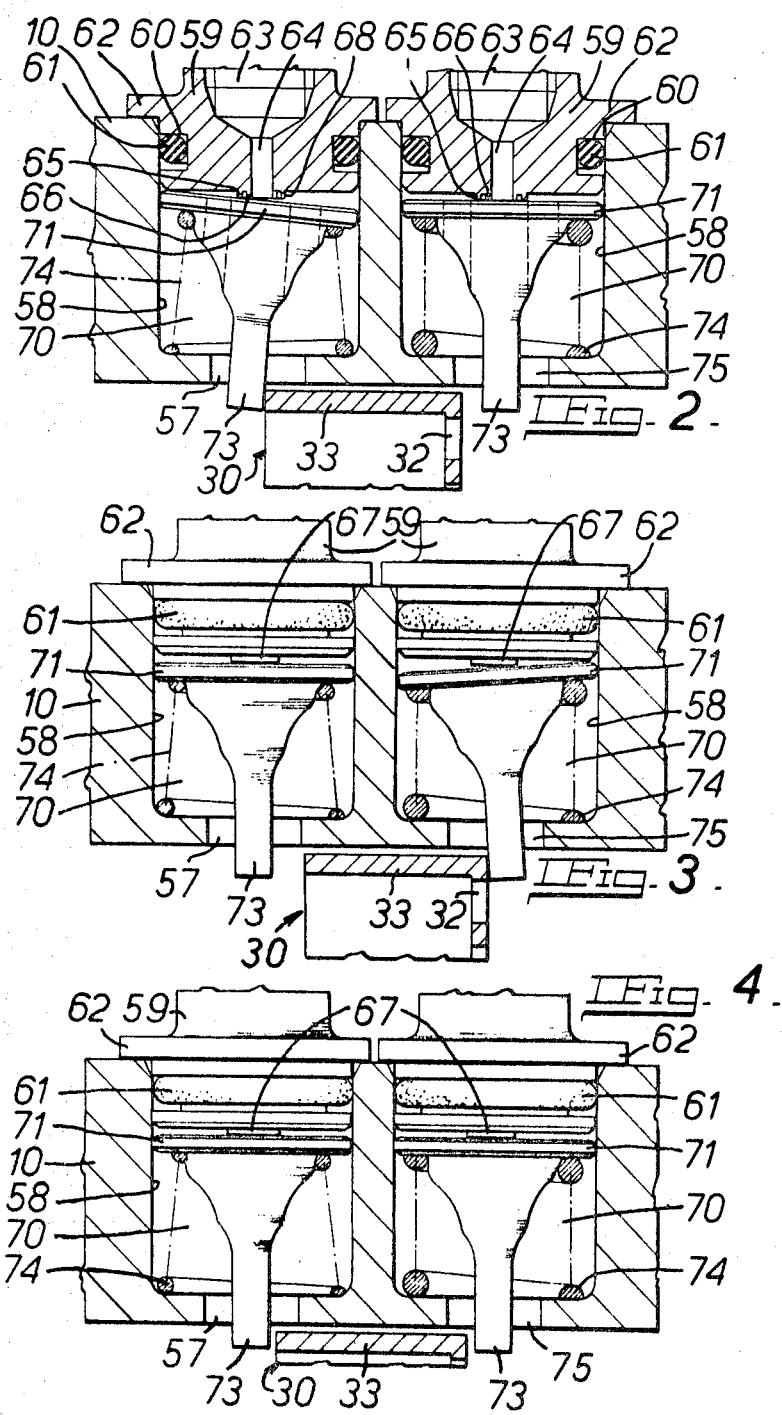

MASTER CYLINDER FOR BRAKING SYSTEMS

This invention relates to improvements in master cylinders for hydraulic braking systems of the kind in which a spring-loaded tilting valve having a stem which extends into a pressure space in the cylinder through an opening in the cylinder wall is engaged by a part of a piston assembly movable axially in the cylinder to tilt the valve into an open position and establish communication between a source of fluid, such as a reservoir or high-pressure supply, and the pressure space through the opening in the cylinder wall.

The engagement of the part of the piston assembly with the stem of the valve holds the valve in the open position, the valve closing automatically when the piston assembly is moved out of engagement with the stem.

According to our invention in a master cylinder of the kind set forth the tilting valve comprises a head member mounted on the upper end of a stem and adapted to seat against a valve seating member surrounding a port for connection to the source of fluid, and one of the members includes an annular projection of small area with which a complementary surface of the other member is adapted to engage, the head member being normally urged into engagement with the seating member by a compression spring acting on the head member.

The radially outermost diametrical edge of the annular projection which provides a fulcrum about which the valve head member is adapted to tilt to open the valve determines the effective moment of the compression spring opposing the opening movement of the valve. By reducing this diameter to the smallest possible value compatible with ensuring that the valve remains stable under all operating conditions so that the head member cannot be accidentally moved away from the seating member when the valve is closed, increases the effective moment of the spring opposing the opening movement of the valve. This has the advantage that the strength of the spring can be reduced to maintain substantially the same moment of the spring thereby reducing by a corresponding amount the force required to open the valve. This in turn increases the sensitivity of the valve.

Reducing still further the area of the annular projection enables the strength of the spring to be reduced still further to provide the same effective closing moment of the spring over that area.

This is achieved according to a further feature of our invention by forming an annular groove in the annular projection to divide the seating into two concentric rings of which the outermost ring is provided with a radial passage connecting the groove with a chamber surrounding the projection.

This ensures that the head member and the seating member seal only on the innermost ring when the valve is in the closed position, although the head member is still adapted to tilt about the outermost peripheral edge of the outermost ring.

Several embodiments of our invention as applied to a tandem master cylinder are illustrated in the accompanying drawings in which:

FIG. 2 is a section on an enlarged scale of a part of the master cylinder illustrated in FIG. 1 showing the position of the tilting valves in the off position of master cylinder;

FIG. 3 is a view similar to FIG. 2 showing the valves in the position which they assume when the master cylinder is actuated;

FIG. 4 is a view similar to FIGS. 2 and 3 showing the valves in a balanced position;

Figure 1:
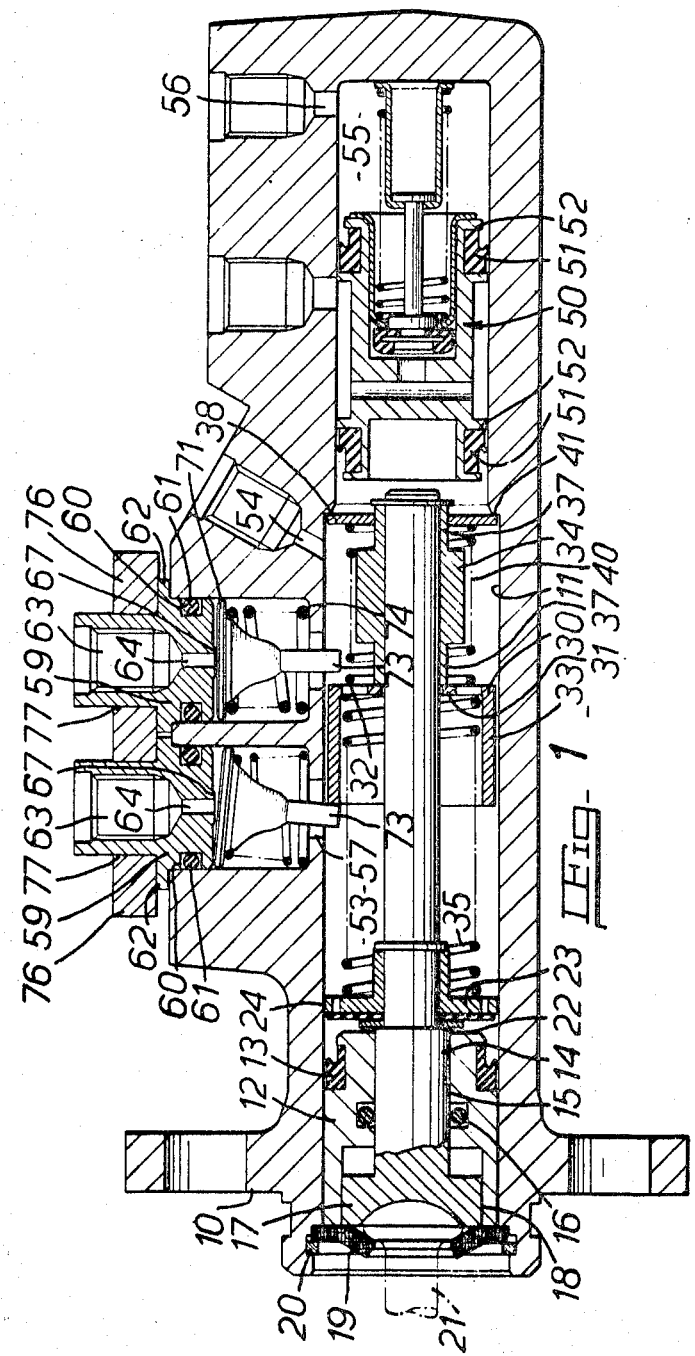
FIG. 1 is a longitudinal section through a tandem master cylinder incorporating a pair of tilting valves constructed in accordance with our invention.
Figure 5:
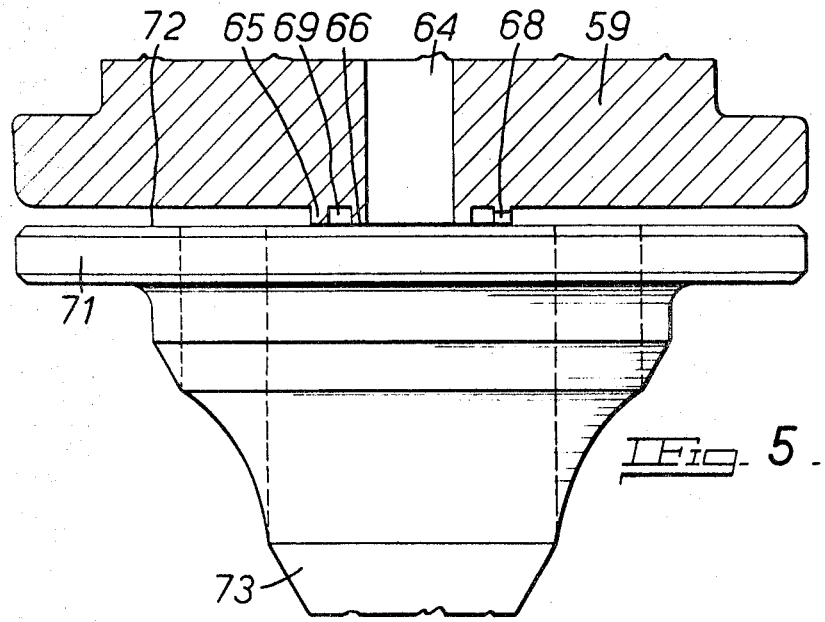
FIG. 5 is a section, on an enlarged scale, of a valve head engaging with a seating in a tilting valve assembly embodied in the master cylinder of FIG. 1.
Figure 6:
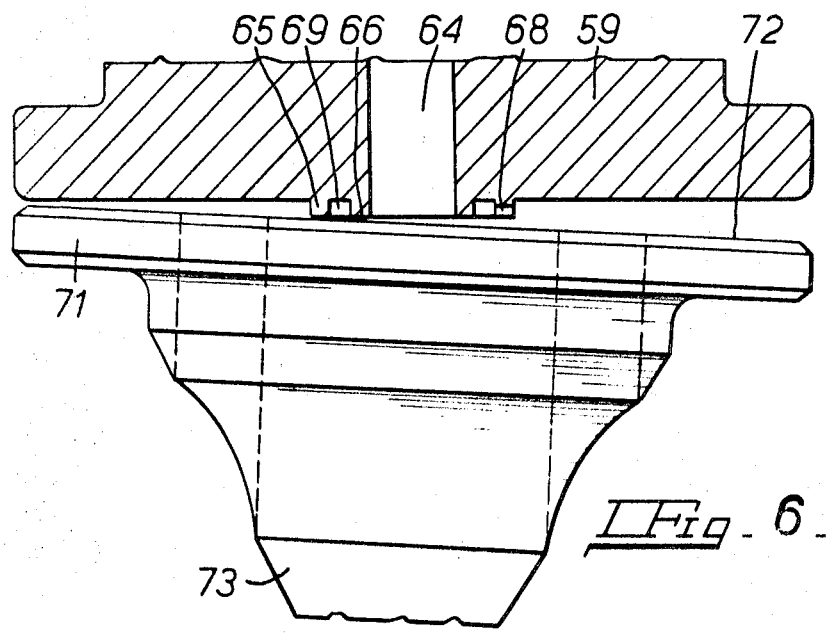
FIG. 6 is a section similar to FIG. 5 showing the valve head in an open position.

In the tandem master cylinder illustrated in FIGS. 1 to 6, 10 is a body having a stepped longitudinal bore 11. A main piston 12 is provided with a seal 13 and works in the portion of the bore 11 of greater diameter. An imperforate rod 14 is axially slidable through a bore 15 in the main piston 12 in which is located a seal 16, and has on its outer end an enlarged head 17 received in a counterbored recess 18 in the outer end of the main piston 12. The axial length of the head 17 is less than the axial spacing between the inner end of the recess 18 and a coned washer 19 which is retained in the rear end of the cylinder bore 11 by a spring ring or circlip 20 and also forms a step for the rearward movement of the main piston 12 and holds a boss on the end of an operating rod 21 in engagement with the outer end of the imperforate rod 14. The imperforate rod 14 thus has a limited free movement, relative to the main piston 12, determined by the clearance between the head 17 and the base of the counterbored recess 18 in the main piston 12.

At a short distance beyond the rear inner end of the main portion 12 the diameter of the imperforate rod is reduced and a shoulder 22 at the step in diameter provides an abutment of a plate assembly or first piston 23 which incorporates a flap-type valve member adapted to damp the flow of fluid through openings in a circular flange 24 at the forward end of the plate assembly and of a diameter slightly less than that of the cylinder bore of greater diameter. This feature forms the subject of our copending British Pat. application No. 28297/68 of even date and need not be described further herein.

A cage or piston assembly 30 slidably mounted on the imperforate rod 14 at an intermediate point in its axial length includes a radial flange 31 provided with a plurality of ports 32 and an annular shroud 33 extending axially towards the main piston 12 from the outer edge of the flange 31. The rear face of the flange 31 is held in abutment with the forward end of a spacer member 34 through which the imperforate rod 14 extends by means of a strong compression spring 35 acting between the flange 31 of the cage assembly 30 and the flange 24 of the first piston 23. The spacer member 34 is held on the imperforate rod 14 by an annular retaining ring at the rear end of the rod 14 and against which the spacer member 24 abuts due to the force in the strong compression spring 35.

The spacer member 34 includes spaced end portion 37 of reduced diameters. An abutment plate 38 slidably mounted on the reduced end portion 37 of the spacer member 34 remote from the main piston 12 is urged towards the retaining ring 34 by a compression spring 40 acting between the abutment plate 38 and the radial flange 31 of the cage assembly 30 to hold the abutment plate against a shoulder 41 at the change in diameter of the stepped bore 11. The compression spring 40 is of less strength than the strong compression spring 35.

The main piston 12, the imperforate rod 14 carrying the first piston 23 and the cage assembly 30, the spacer member 34 and the abutment plate 38 comprises a subassembly which contains the forces of the compression springs 35 and 40. The subassembly is slightly greater in length than the portion of the bore 11 of the cylinder body 10 of greater diameter. When the subassembly is inserted into the cylinder bore from the forward open end, the abutment plate 38 engages with the shoulder 41 in the body at the step in diameter, and the lighter spring 40 is compressed slightly to allow the subassembly to be accommodated within the bore, and to be held in position by the coned washer 19 and the circlip 20.

A secondary piston 50 provided at opposite ends with axially spaced annular sealing rings 51 located in axially spaced annular recesses 52 works in the portion of the cylinder bore 11 of smaller diameter and is normally spaced at its forward end from the rear end of the cylinder body 10. A first pressure space 53 in the cylinder bore 11 between the first piston 23 and the secondary piston 50 is connected to the slave cylinders of the brakes of a primary braking circuit, conveniently the rear wheels of the vehicle, through an outlet port 54 in the wall of the cylinder body 10.

A second pressure space 55 in the cylinder bore between the rear end of the secondary piston 50 and the end wall of the cylinder bore is connected to the slave cylinders of the brakes of a secondary brake circuit, conveniently the front wheels of the vehicle, through a further outlet port 56 in the wall of the cylinder body.

Communication between the first pressure space 53 and a reservoir for fluid is established, in the off position of brake, through a port 57 in the wall of the cylinder body 10 leading into a recess 58 in the cylinder wall. A union 59 received in the outer end of the recess 58 is provided with an annular groove 60 in which is housed an annular sealing ring 61 adapted to seal against the wall of the recess 58, and a radial flange 62 spaced above the groove 60 abuts against the outer face of the cylinder body surrounding the recess 58. The union 59 is provided with an outlet connection 63 leading at its inner end into a central port 14. The lower face of the union 59 is provided with a pair of concentric downwardly extending annular rings 65, 66 forming an annular valve seating (see FIGS. 2, 5 and 6). The innermost peripheral edge of the innermost ring 66 is aligned with and continuous with the port 64, and a radial passage 68 passing through the outer ring 65 provides communication between a groove 69 located between the rings, and a chamber 70 formed between the base of the recess 58 and the lower end of the union 59. A valve head 71 of a diameter slightly less than that of the recess 58 is located in the chamber 70, and has a substantially flat upper end face 72, adapted to seat against the lower ends of the rings 65, 66 forming the seating. The head 71 is mounted on the upper end of a stem 73 and is urged upwardly by a conical compression spring 74 located between the head and the base of the recess 58. The end of the spring 74 of smaller diameter acts on the head 71 on an annulus having a diameter greater than that of the outer ring 65 of the valve seating 67. The lower end of the stem 73 extends downwardly through the port 57 into the path of the free end of the shroud 33 of the cage assembly 30, and, when the main piston 12 and the imperforate rod 14 are in their fully retracted positions, the shroud 33 engages with the lower end of the valve stem 73 to hold the valve in a tilted position so that the first pressure space 53 is in free communication with the reservoir through the port 64 in the union 59 and the port 57 in the cylinder wall.

The provision of the radial passage 68 ensures that the valve head 71 makes a sealing engagement with only the innermost annular ring 66, and thus the sealing area of the valve head 71 is reduced to a minimum.

Communication between the first pressure space and a source of high-pressure fluid, such as the pump or hydraulic accumulator, through a further port 75 in the cylinder wall is controlled by a further tilting valve identical in construction to the tilting valve controlling communication between the first pressure space 53 and the reservoir. Corresponding reference numerals have therefore been used to indicate corresponding parts. When the main piston 12 and the imperforate rod 14 are in their fully retracted positions, the lower end of the stem 73 of the further tilting valve which extends downwardly through the further port 75 in the cylinder is spaced by a short distance from the flange 31 of the cage assembly 30. Due to the force in the compression spring 74 the head 71 of this tilting valve is urged against the valve seating 67 and seats against the innermost annular ring 66 to close the port 64 in the union 59 and prevent fluid under pressure being supplied to the first pressure space 53 from the hydraulic accumulator or pump.

The unions 59 and the tilting valve assemblies are held in position by a retaining plate 76 secured to the cylinder body 16. The retaining plate 76 is provided with spaced openings 77 adapted to receive the outer ends of the unions 59 and abuts against the upper faces of the radial flanges 62 engaging with the cylinder body 10. Each opening 77 in the plate is generally circular but is provided with a straight chordal portion lying parallel to and closely adjacent to a complementary chordal portion in the other opening (not shown). The chordal portions engages with complementary flats on the unions to prevent the unions rotating relative to the recesses in which they are received.

When the pedal is depressed to apply the brakes with the high-pressure source operative the imperforate rod 14 is moved rearwardly through a small distance. Due to the force in the strong compression spring 35, the cage assembly 30 is moved with the rod 14 through a corresponding distance overcoming the force in the light compression spring 40. The shroud 33 moves out of contact with the stem 73 of the tilting valve controlling communication between the reservoir for the high-pressure source and the first pressure space 53 to allow this tilting valve to close. Thereafter, a small additional rearward movement of the cage assembly 30 opens the other tilting valve, by the engagement with its stem 73 of the rear end of the shroud 33, to permit fluid from the high-pressure source to enter the first pressure space 53 and to pass to the slave cylinders of the primary brake circuit of the vehicle through the outlet port 54. Simultaneously, the high-pressure fluid acts on the forward end of the secondary piston 50 to advance it in the bore and deliver fluid under pressure to the slave cylinders on the secondary brake circuit from the second pressure space 55.

In the event of failure of the high-pressure source further movement of the imperforate rod 14 takes up the clearance between the head 17 on the outer end of the rod 14 and the inner end of the recess 18 in the main piston 17 and a shoulder adjacent to the rear end of the spacer member abuts against the abutment plate 38. Thereafter further depression of the pedal overcomes the force in the strong compression spring 35 and carries with it the main piston 12 to pressurize the fluid in the first pressure space 53 and apply to brakes of the primary brake circuit of the vehicle. The pressure in the first pressure space 53 also acts on the secondary piston 50 to advance the secondary piston 50 in the cylindrical bore and apply the brakes on the secondary brake circuit as described above.

In these circumstances, as the force in the strong compression spring 35 is being overcome, the additional force exerted by the compression spring 74 loading the tilting valve controlling communication between the first pressure space 53 and the high-pressure source has to be overcome also. Since our construction reduces to a minimum the force required to open the tilting valve, operation of the master cylinder under these conditions is facilitated.

The valve and valve seat assemblies incorporated in the master cylinder of FIG. 1 may be replaced by the modified constructions illustrated in FIGS. 7 to 12 of the accompanying drawings, and in each of these constructions, corresponding reference numerals have been used where appropriate to indicate corresponding parts.

Figure 7:
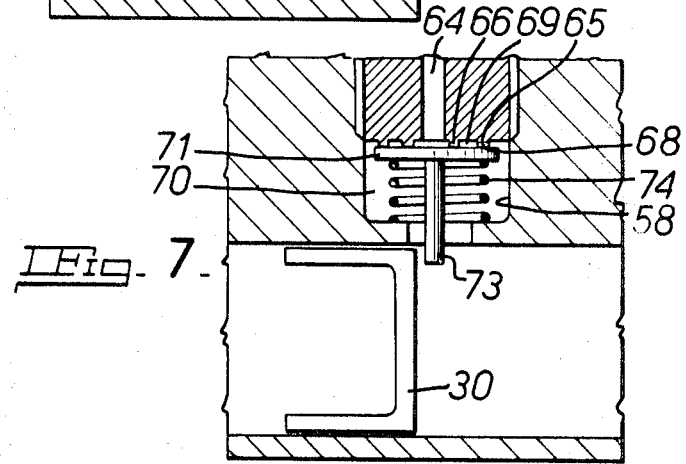
FIG. 7 is a section through a modified valve for incorporation in the master cylinder illustrated in FIG. 1 incorporating a modified compression spring having parallel coils.

In the modified valve illustrated in FIG. 7 the compression spring 74 acting on the head 71 of the tilting valve is of a constant diameter over the whole of its axial length and acts on an annulus on the head substantially equal in diameter to that of the outermost annular ring 65.

Figure 8:
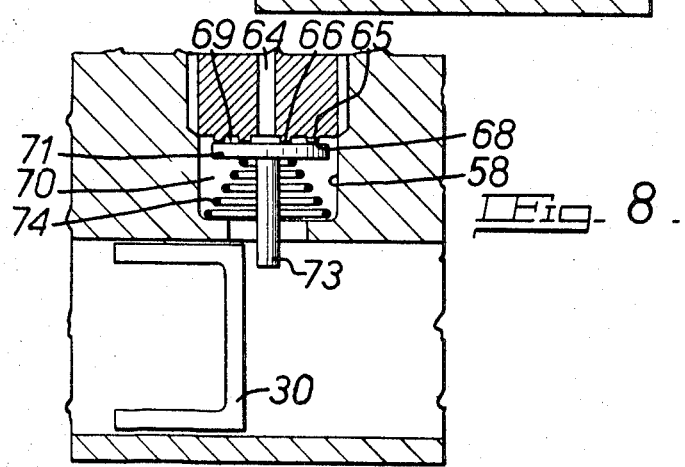
FIG. 8 is a section through a further modified valve for incorporation in the master cylinder illustrated in FIG. 1, in which the end of a conical compression spring acting on the valve head is substantially equal in diameter to that of the innermost annular ring.

In the embodiment of FIG. 8 the compression spring 74 is of conical outline and, at its end of smaller diameter, acts on the valve head on an annulus substantially equal in diameter to that of the innermost annular ring 66.

Figure 9:
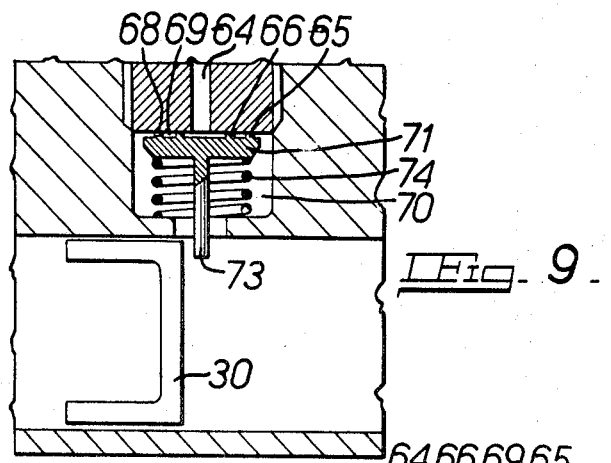
FIG. 9 is a section through yet a further modified valve in which concentric annular rings on the valve head engage with the valve seating.

In the embodiment of FIG 9 the concentric annular rings 65, 66 are mounted on the valve head 71 for engagement with a flat seating surrounding the port 64 in the union 59. The compression spring 74 is a constant diameter throughout its axial length. It is to be understood however, that the spring 74 may be replaced by a spring of conical outline of which the end of smaller diameter engages with the head 71 at a position substantially aligned with the innermost annular ring 66 or at a position radially outwardly from the outermost ring 65.

Figure 12:
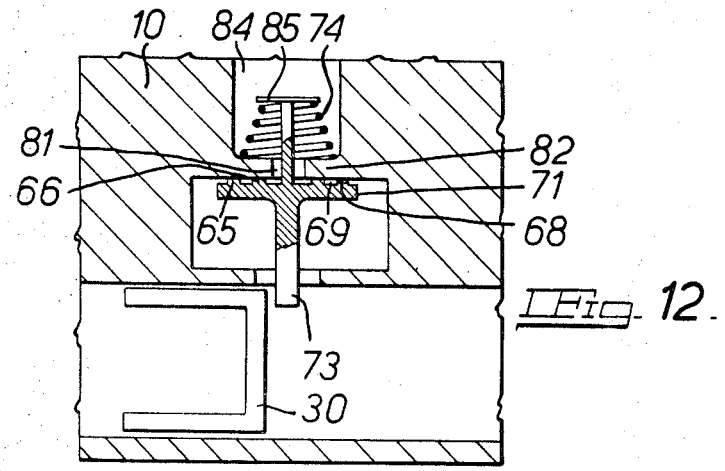
FIG. 12 is a section through a valve similar to FIG. 10 but in which concentric annular rings are provided on the valve head.
Figure 10:
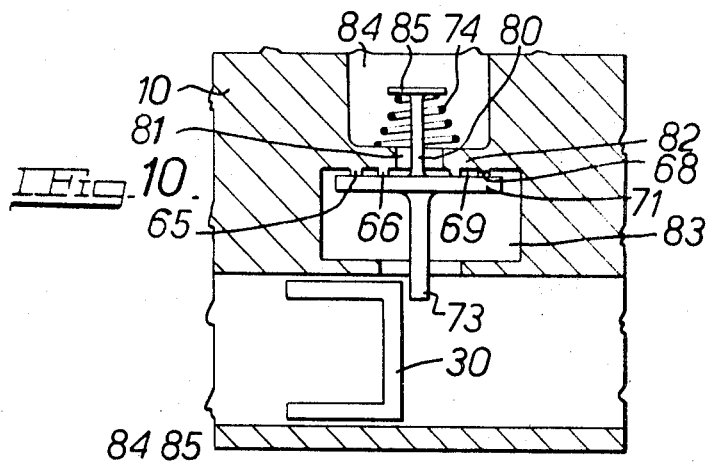
FIG. 10 is a section through a valve in which a compression spring acts between the free end of a stem extending through a port controlled by the valve head and the wall of the cylinder body surrounding the port.
Figure 11:
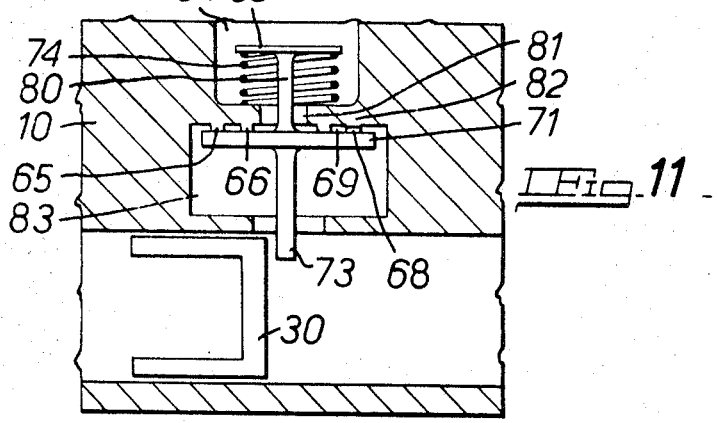
FIG. 11 is a section through a valve similar to FIG. 10 incorporating a conical compression spring.

In the modified construction illustrated in FIGS. 10 to 12, the valve head 71 is mounted on a stem 80 which extends through the port 81 in a partition 82 between a chamber 83 in which the valve head 12 is located, and a recess 84 in the body 10 adapted to receive a union for connection to the reservoir or source of high-pressure fluid. A collar 85 on the upper end of the stem 80 provides an abutment for one end of the compression spring 74 which acts at its opposite end against the partition 82 at the base of the recess 84 to urge the head 71 into engagement with the lower face of the partition 82 surrounding the port 81.

In the embodiment of FIG. 10 the compression spring 74 is of conical outline acting against the abutment collar 85 at its end of smaller diameter, and the rings 65 and 66 comprise the valve seating and extend downwardly from the lower face of the partition 82.

In the embodiment of FIG. 11 the compression spring 74 is of a constant diameter throughout its axial length.

The embodiment of FIG. 12 is identical with that of FIG. 10 except that the annular rings 65 and 66 are carried by the valve head 71 and engage with a flat surface of the partition 82 surrounding the port 81.

In a modification the conical spring embodied in FIG. 12 may be replaced by a spring which is of constant diameter throughout its axial length.

We claim:

1. In a master cylinder for an hydraulic braking system comprising a cylinder body having a wall defining a cylinder bore, means defining a pressure space in the cylinder bore, a piston assembly moveable axially in said pressure space, a valve seating member in said wall having a port for connection to a source of fluid, and a tilting valve controlling communication between said port and said pressure space through an opening in a portion of said wall and comprising a valve head member, a compression spring adapted to urge said valve head member into engagement with said valve seating member to close said port, and a stem having an upper end upon which said valve head member is carried and a lower end extending into said pressure space through said opening and with which said piston assembly is adapted to engage to hold said tilting valve in an open position whereby communication between said pressure space and said source of fluid is established, the improvement comprising an annular projection of small area provided on one of said members, and the other of said members is provided with a surface complementary to said annular projection which is adapted to engage therewith to close said port, wherein said projection is divided into inner and outer concentric rings by an annular groove, and said outer concentric ring is provided with a radial passage connecting said groove with said pressure space.

2. The improvement as claimed in claim 1, wherein said outer ring has a radially outermost diametrical edge providing a fulcrum about which said valve head member is adapted to tilt to open said valve.

3. The improvement as claimed in claim 1, wherein said tilting valve is housed within a chamber between said valve seating member and said portion of said wall containing said opening.

4. The improvement as claimed in claim 1, wherein said annular projection is provided on said valve seating member and surrounds said port.

5. The improvement as claimed in claim 1, wherein said annular projection is provided on said valve head member.

6. The improvement as claimed in claim 1, wherein said compression spring acts between said head member and said portion of said wall surrounding said opening.

7. The improvement as claimed in claim 1, wherein a stem extending through said port has an inner end secured to said valve head member and an outer end and said compression spring acts between said outer end of said stem extending through said port and a side of said valve seating member opposite to that with which said head member is adapted to engage.

8. The improvement as claimed in claim 1, wherein said compression spring is of conical outline having opposite ends of smaller and greater diameters.

9. The improvement as claimed in claim 8, wherein said smaller diameter end of said conical compression spring acts on said valve head member over an annulus having a diameter greater than that of said annular projection.

10. The improvement as claimed in claim 8, wherein said smaller diameter end of said conical compression spring acts on said valve head member over an annulus having a diameter less than that of the maximum diameter of said annular projection.

11. The improvement as claimed in claim 1, wherein said compression spring is of a constant diameter through its axial length.

12. The improvement as claimed in claim 11, wherein said compression spring acts on said valve head member over an annulus having a diameter less than that of the maximum diameter of said annular projection.

13. The improvement as claimed in claim 1 incorporating a pair of axially spaced spring-loaded tilting valves, each valve having a stem which extends into the pressure space through an opening in said cylinder wall, and said valves are opened alternatively by the engagement with the said stems of said valves of opposite ends of said piston to establish communication between a reservoir and said pressure space, and between a source of hydraulic fluid under pressure and said pressure space.

14. The improvement as claimed in claim 13, wherein said pressure space comprises a primary pressure space for applying fluid under pressure to brakes of a primary braking circuit, said primary pressure space being defined between a positively actuated main piston working in said cylinder bore and an adjacent end of a secondary piston working in said cylinder bore, and a secondary pressure space located between said secondary piston and an adjacent end wall of the cylinder bore is adapted to apply fluid under pressure to brakes of a secondary brake circuit.